Jan. 12, 1960     D. R. CLEMONS     2,921,113
ELECTRICAL CONDENSERS
Filed May 12, 1954

INVENTOR
D. R. CLEMONS
BY C. B. Hamilton
ATTORNEY

United States Patent Office 2,921,113
Patented Jan. 12, 1960

2,921,113

ELECTRICAL CONDENSERS

Dale R. Clemons, Riverside, Ill., assignor to Western Electric Company, Incorporated, a corporation of New York Application May 12, 1954, Serial No. 429,143

3 Claims. (Cl. 174—50.54)

This invention relates to electrical condensers, and more particularly to clip-type condensers.

An object of the invention is to provide new and improved condensers.

Another object of the invention is to provide new and improved clip-type condensers.

A further object of the invention is to provide a glass-enclosed, clip-type condenser.

A condenser illustrating certain features of the invention may include a glass tube open at one end, a condenser core and leads extending from opposite ends of the core to the open end of the tube. One of the leads extends through a ceramic bushing sealed to the open end of the tube, and the other lead extends between the bushing and the tube and is connected to a band of conductive material mounted on the tube.

A complete understanding of the invention may be obtained from the following detailed description of a condenser forming a specific embodiment thereof, when read in conjunction with the appended drawings, in which—

Figure 1:
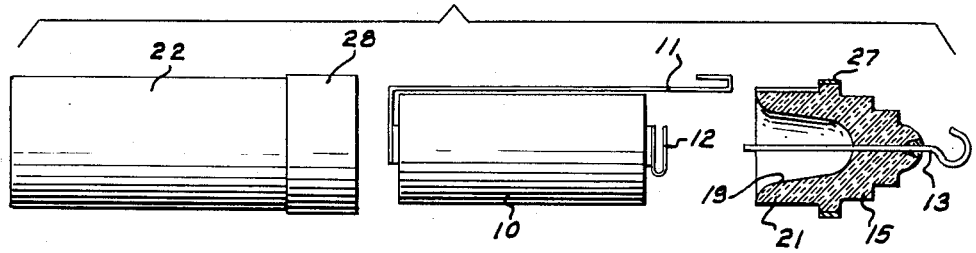
Figure 2:
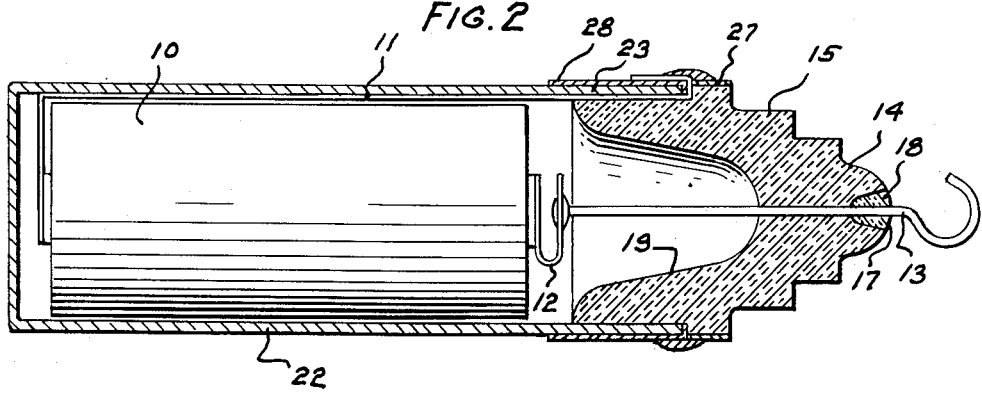

Fig. 1 is an exploded view of a condenser forming one embodiment of the invention, and Fig. 2 is a sectional view of the condenser shown in Fig. 1.

Referring now in detail to the drawings, there is shown therein a clip-type condenser which includes an impregnated condenser unit 10 which may be of wound metallized paper, electrolytic or of the interleaved type. In assembling the condenser, thin spring terminal strips 11 and 12 composed of tinned bronze are soldered to opposite ends of the unit 10. One end of a wire lead 13 extending through a bore 14 in a cap 15 composed of ceramic material is soldered, welded or riveted to the resilient strip 12, which is U-shaped. The lead 13 is sealed to the cap by glass 17 fused in a recess 18, and the cap has a relieved portion 19 to form a long path for any possible leakage.

The cap 15 is provided with a shank 21 designed to fit snugly in a glass tube 22, and has a shallow groove 23 to permit the strip 11 to extend between the tube and the bushing. A rim 27 of the cap has silver paste fused thereon, and silver paste is fused to the periphery of the tube to form a conductive band 28.

After the strip 12 has been soldered to the wire lead 13, the free end of the strip 11 is bent to the shape of a U and fitted into the groove 23. The unit 10 and the shank 21 of the cap 15 then are inserted into the tube with the free end of the strip 11 engaging the band 28. Solder is applied to the band 28, the rim 27 and the free end of the strip 11 to seal the interior of the tube 22, firmly secure the cap to the tube and provide a low resistance connection between the strip 11 and the band. In using the condenser, it may be placed in a spring clip connector (not shown) so that the connector engages the band 28, and a conductor may be connected to the lead wire 13.

The above-described condenser is simple, rugged and compact, and can be nested in a clip serving both as a mechanical support and as an electrical connection for one side of the condenser. The construction of the condenser is such that the resilient connecting strips 11 and 12 allow for thermal expansion with a minimum of strain on the connections, and also presents both terminals at one end thereof to facilitate connections thereto. The terminal strips 11 and 12 being made of spring metal resiliently support the condenser unit in a suspended position within the glass tube 22.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A condenser, which comprises a tube of insulating material open at one end and closed at the other end, a bushing of insulating material having a shank fitting into the open end of the tube, a condenser unit in the tube and extending therealong, a flexible conductor connected to and extending from the end of the unit nearer the open end of the tube for supporting that end of the unit, a resilient lead extending through and sealed to the bushing and fastened to the conductor, a second flexible conductor secured to the other end of the unit and extending between the tube and the unit and the tube and the bushing to the exterior of the tube for supporting the last-mentioned end of the unit, a conductive band on the exterior rim portion of the tube, and a connection of solder securing and sealing the bushing to the tube and connecting the second flexible conductor to the band.

2. A condenser, which comprises a tube of insulating material open at one end and closed at the other end, a bushing of insulating material having a shank fitting into the open end of the tube, a cylindrical condenser unit fitting loosely in the tube and extending along only a portion thereof, a U-shaped resilient metal strap connected electrically and mechanically to the end of the unit nearer the open end of the tube, a resilient lead extending through and sealed to the bushing and fastened electrically and mechanically to the strap, a second resilient metal strap secured to the other end of the unit and extending between the tube and the unit and the tube and the bushing to the exterior of the tube, a conductive band mounted on the tube in the vicinity of the rim of the tube, and a connection of solder securing and sealing the bushing to the tube and connecting the second strap to the band, said straps being the sole means for holding the condenser unit in the tube.

3. A condenser, which comprises a glass tube open at one end and closed at the other end, a ceramic bushing having a shank fitting into the open end of the tube, said shank having a groove extending therealong, a cylindrical condenser unit in the tube and extending therealong, a resilient U-shaped metal strap fastened electrically and mechanically to the end of the unit nearer the open end of the tube, for supporting that end of the unit, a resilient lead extending through and sealed to the bushing and fastened to the free end of the strap, a second resilient metal strap fastened electrically and mechanically to the other end of the unit and extending between the tube and unit and the tube and the bushing to the exterior of the tube for supporting the last-mentioned end of the unit, a conductive band on the exterior rim portion of the tube, and a connection of solder securing and sealing the bushing to the tube and connecting the second strap to the band.

(References on following page)

References Cited in the file of this patent
UNITED STATES PATENTS

| | | |
|---|---|---|
| 1,303,325 | James | May 13, 1919 |
| 1,898,789 | Ringwald | Feb. 21, 1933 |
| 1,993,560 | Martin | Mar. 5, 1935 |
| 2,047,023 | Geiger | July 7, 1936 |
| 2,142,705 | Tarr | Jan. 3, 1939 |
| 2,242,784 | Hartzell | May 20, 1941 |
| 2,523,083 | Witkowski | Sept. 19, 1950 |
| 2,596,134 | Dorst | May 13, 1952 |
| 2,668,278 | Avery | Feb. 2, 1954 |
| 2,711,498 | Robinson | June 21, 1955 |

FOREIGN PATENTS

| | | |
|---|---|---|
| 260,773 | Great Britain | Nov. 18, 1926 |
| 334,074 | Italy | Jan. 21, 1936 |